United States Patent
Bruckman

(10) Patent No.: US 7,330,431 B2
(45) Date of Patent: Feb. 12, 2008

(54) MULTIPOINT TO MULTIPOINT COMMUNICATION OVER RING TOPOLOGIES

(75) Inventor: Leon Bruckman, Petah Tikva (IL)

(73) Assignee: Corrigent Systems Ltd., Tel Aviv (IL)

( * ) Notice: Subject to any disclaimer, the term of this patent is extended or adjusted under 35 U.S.C. 154(b) by 700 days.

(21) Appl. No.: 10/933,572

(22) Filed: Sep. 3, 2004

(65) Prior Publication Data
US 2006/0050665 A1  Mar. 9, 2006

(51) Int. Cl.
 *H04L 12/26* (2006.01)
(52) U.S. Cl. .................. 370/232; 370/231; 370/235
(58) Field of Classification Search ........ 370/229–235, 370/237–238, 395.2–395.21
See application file for complete search history.

(56) References Cited

U.S. PATENT DOCUMENTS

| | | | |
|---|---|---|---|
| 5,235,593 A | 8/1993 | Grow et al. | |
| 5,461,611 A | 10/1995 | Drake et al. | |
| 5,581,703 A | 12/1996 | Baugher et al. | |
| 5,706,516 A | 1/1998 | Chang et al. | |
| 5,854,903 A * | 12/1998 | Morrison et al. | 709/249 |
| 5,933,422 A | 8/1999 | Kusano et al. | |
| 6,021,263 A | 2/2000 | Kujoory et al. | |
| 6,157,654 A | 12/2000 | Davis | |
| 6,169,783 B1 | 1/2001 | Brooks et al. | |
| 6,256,292 B1 | 7/2001 | Ellis et al. | |
| 6,262,976 B1 | 7/2001 | McNamara | |
| 6,339,488 B1 | 1/2002 | Beshai et al. | |
| 6,370,121 B1 | 4/2002 | Hausman | |
| 6,400,681 B1 | 6/2002 | Bertin et al. | |
| 6,442,134 B1 | 8/2002 | Mitchell | |
| 6,456,407 B1 | 9/2002 | Tammela et al. | |
| 6,486,988 B1 | 11/2002 | Lewis et al. | |
| 6,507,577 B1 | 1/2003 | Mauger et al. | 370/356 |
| 6,510,141 B1 | 1/2003 | Ramfelt et al. | 370/254 |
| 6,522,627 B1 | 2/2003 | Mauger | 370/230 |
| 6,560,231 B1 | 5/2003 | Kawakami et al. | |
| 6,580,693 B1 * | 6/2003 | Chernyak et al. | 370/248 |
| 6,584,535 B1 | 6/2003 | Ouellet et al. | |
| 6,624,917 B1 | 9/2003 | Paschal et al. | |

(Continued)

OTHER PUBLICATIONS

Moy, "OSPF", Version 2, published as Request for Comments (RFC) 2328 of the Internet Engineering Task Force (IETF) Network Working Group, Apr. 1998.

(Continued)

*Primary Examiner*—Chi Pham
*Assistant Examiner*—Thai Hoang
(74) *Attorney, Agent, or Firm*—Weingarten, Schurgin, Gagnebin & Lebovici LLP

(57) ABSTRACT

A method for assigning bandwidth in a network including nodes coupled by links arranged in a physical topology, the method including: defining between the nodes logical connections associated with a data transmission service to be provided over the network, the logical connections having a connection topology different from the physical topology, and determining respective bandwidth requirements for the logical connections based on parameters of the service. The method further includes mapping the connection topology to the physical topology, so that each of the logical connections is associated with one or more links of the physical topology, and allocating a bandwidth for the service on each of the links in response to the bandwidth requirements of the logical connections and to the mapping.

30 Claims, 4 Drawing Sheets

U.S. PATENT DOCUMENTS

| | | |
|---|---|---|
| 6,625,155 B1 | 9/2003 | Dziong |
| 6,639,893 B1 | 10/2003 | Chikenji et al. |
| 6,639,896 B1 | 10/2003 | Goode et al. |
| 6,647,008 B1 | 11/2003 | Galand et al. |
| 6,678,241 B1 | 1/2004 | Gai et al. |
| 6,680,912 B1 | 1/2004 | Kalman et al. |
| 6,711,125 B1 | 3/2004 | Walrand et al. |
| 6,731,597 B1 | 5/2004 | Batchellor et al. |
| 6,757,286 B1 | 6/2004 | Stone |
| 6,763,025 B2 | 7/2004 | Leatherbury et al. |
| 6,778,494 B1 | 8/2004 | Mauger ............. 370/230 |
| 6,795,394 B1 | 9/2004 | Swinkels et al. |
| 6,801,506 B1 | 10/2004 | Dey |
| 6,820,210 B1 | 11/2004 | Daruwalla et al. |
| 6,826,147 B1 | 11/2004 | Nandy et al. |
| 6,826,158 B2 | 11/2004 | Seaman et al. |
| 6,922,394 B2 | 7/2005 | Kajiwara |
| 6,934,259 B2 | 8/2005 | Klincewicz et al. |
| 6,952,397 B2 | 10/2005 | Mor et al. ............. 370/223 |
| 6,965,612 B2 | 11/2005 | Chohan et al. |
| 6,992,975 B1 | 1/2006 | Daniel et al. ........... 370/222 |
| 7,035,279 B2 | 4/2006 | Bruckman ............. 370/460 |
| 7,042,846 B2 | 5/2006 | Bauer |
| 7,058,008 B1 | 6/2006 | Wilson et al. |
| 7,158,486 B2 | 1/2007 | Rhodes |
| 7,161,899 B2 | 1/2007 | Limaye et al. |
| 7,184,402 B1 | 2/2007 | Sharma et al. |
| 2002/0133756 A1* | 9/2002 | Jain ............. 714/43 |
| 2002/0181479 A1 | 12/2002 | Okuno |
| 2002/0186661 A1 | 12/2002 | Santiago et al. |
| 2003/0002443 A1 | 1/2003 | Basso et al. |
| 2003/0055920 A1 | 3/2003 | Kakadia et al. |
| 2003/0145108 A1 | 7/2003 | Joseph et al. |
| 2003/0158930 A1 | 8/2003 | Mc Bride |
| 2003/0223428 A1 | 12/2003 | Blanquer et al. |
| 2004/0052274 A1 | 3/2004 | Wang et al. |
| 2004/0071089 A1 | 4/2004 | Bauer et al. |
| 2004/0076176 A1 | 4/2004 | Kfir |
| 2004/0105459 A1 | 6/2004 | Mannam |
| 2005/0030948 A1 | 2/2005 | Wyatt |

OTHER PUBLICATIONS

Awduche, et al., "Requirement for Traffic Engineering Over MPLS", published as IETF RFC 2702, Sep. 1999.
Blake, S. et al., "Architecture for Differentiated Services", Internet Engineering Task Force, Network Working Group, RFC 2457, Dec. 1998.
Seddigh, N. et al., "An Assured Rate Per-Domain Behaviour for Differentiated Services", Internet Engineering Task Force, Network Working Group, Jul. 2001.
D. Tsiang et al., Request for Comments (RFC) 2892 of the Internet Engineering Task Force (IETF), Aug. 2000.
Braden, et al., in IETF RFC 2205, "Resource ReServation Protocol (RSVP)—Version 1 Functional Specification", Sep. 1997.
Andersson, et al., in IETF RFC 3036, "LDP Specification" Jan. 2001.
Yavatkar et al., RFC 2814 "A Protocol for RSVP—Based Admission Control Over IEEE 802-Style Networks", May 2000, pp. 1-56.
Official Action dated Nov. 28, 2005, which issued during the prosecution of US Assignee/Israeli Applicant's U.S. Appl. No. 10/054,845, filed Jan. 25, 2002.
Office Action dated Mar. 21, 2006 which issued in Applicant's U.S. Appl. No. 10/128,454, filed Apr. 24, 2002.
An Official Action dated Sep. 29, 2006, which issued during the prosecution of Applicant's U.S. Appl. No. 10/211,066.
Dziong, et al., "A Framework For Bandwidth Management In ATM Networks—Aggregate Equivalent Estimation Approach", IEEE/ACM transactions on networking, vol. 5, No. 1, Feb. 1997.
Inverse Multiplexing over ATM, Strategic Technologies Group, Jul. 12, 2001.
The PPP Multilink Protocol (MP) Standard, RFC 1990, The Internet Engineering Task Force, www.ietf.org, Aug. 1996.

* cited by examiner

MULTIPOINT TO MULTIPOINT COMMUNICATION OVER RING TOPOLOGIES

FIELD OF THE INVENTION

The present invention relates generally to data communications within a network, and specifically to optimizing bandwidth allocation for the data in the network.

BACKGROUND OF THE INVENTION

Packet ring networks are typically significantly easier to operate and administer than complex mesh or irregular networks, and a ring network may also allow for failure of a link between nodes of the network, if the network is bi-directional. The leading bi-directional protocol for high speed packet rings is the Resilient Packet Ring (RPR) protocol, defined by IEEE Standard 802.17.

If services provided by the ring network do not require guaranteed bandwidth, all nodes (termed stations in RPR) operating in the ring may use a "Best Effort" approach to transfer packets. To meet guarantee needs, however, RPR allocates guaranteed bandwidth for class A traffic and some class B traffic. (RPR defines three classes of traffic: class A, class B, and class C. Class A is a low latency, low jitter class.) Class A0 is a subdivision of class A. The bandwidth of a class A0 traffic reservation may only be used by the station holding the reservation, and any such reserved bandwidth that is unused is wasted.

At initiation of an RPR network a station on the RPR network broadcasts reservation requests for its class A0 traffic using topology messages (which are also used for stations to notify each other of their existence and position in the ring). The reservations are typically determined by Service Level Agreements (SLAs) between users and an operator of the ring. A Connection Admission Controller (CAC) in the network allocates bandwidth according to the received requests, and all stations on the RPR are informed of the allocation. For any new service, the CAC must know how much bandwidth has been consumed, and how much is required by the new service, to verify that the new service can be provisioned according to the new service's SLA. In addition, and regardless of the class of traffic, it may be necessary to reserve some bandwidth to avoid traffic starvation.

SUMMARY OF THE INVENTION

In a ring network, bandwidth allocation for guaranteed point-to-point traffic can be estimated based on parameters such as interface type, user requirements, and the path on the ring between the two end points. Furthermore, for this traffic, the bandwidth consumed by each link intervening between a start point and an end point on the ring is equal to the bandwidth required at the start and end points. Thus, for guaranteed point-to-point traffic, actual bandwidth needed for each link between stations on the ring can be well estimated.

On the other hand, for guaranteed point-to-multipoint traffic and guaranteed multipoint-to-multipoint traffic, good estimation of actual bandwidth needs is difficult. Point-to-multipoint traffic is characteristic, for example, of Video On Demand Service (VODS), while multipoint-to-multipoint traffic is typical in Virtual Private LAN Service (VPLS). In both of these types of traffic there are multiple paths between the start and the end points, and guaranteed bandwidth is often required. Although estimation is difficult, it is necessary in order for the CAC to be able to function.

One method to allocate guaranteed bandwidth in multipoint cases is to allocate the full required bandwidth for all possible paths that packets may travel. In this case there will always be sufficient bandwidth, at the expense of large guaranteed bandwidth wastage. Embodiments of the present invention provide methods and systems for bandwidth allocation that make more efficient use of the guaranteed bandwidth available on the ring network.

In embodiments of the present invention, nodes of a network, such as a ring network, are coupled by links according to a physical topology. One or more data transmission services operate between the nodes. Each service has a logical connection topology that may be different from the physical topology. The service parameters for each service determine how much bandwidth each of the nodes in the network participating in the service is required to supply for that service. For each service, a controller in the network maps the logical connections in the logical connection topology of the service to corresponding physical links in the physical topology. The controller determines how the bandwidth of each participating node is to be distributed among the logical connections in the logical topology, and then generates an actual bandwidth requirement for each of the physical links, based on the mapping.

Typically, the logical connection topology for each service is chosen from a number of different logical connection topologies, such as a hub and spoke topology and a full mesh topology, depending on the nature of the service (such as VODS or VPLS). Assigning the actual bandwidths of the links in a physical network according to the logical connectivity of nodes in services carried by the network is a simple and effective way to allocate bandwidth correctly and efficiently, particularly guaranteed bandwidth.

In some embodiments, at least some of the actual bandwidths are multiplied by a correction factor, typically the same for each of the links, that allows for deviation from the assigned actual bandwidth.

In a disclosed embodiment, different services operate in the network, each service having a respective logical connection topology and corresponding bandwidths for nodes participating in the service. Bandwidth requirements for each of the physical links in the network are determined by mapping each of the respective logical topologies to the physical topology of the network, and then adding up the bandwidths required by all the services on each of the links.

Typically, during operation of the network, actual bandwidth usage is monitored, and the assigned bandwidths may be altered to reflect the usage.

There is therefore provided, according to an embodiment of the present invention, a method for assigning bandwidth in a network including nodes coupled by links arranged in a physical topology, the method including:

defining between the nodes logical connections associated with a data transmission service to be provided over the network, the logical connections having a connection topology different from the physical topology;

determining respective bandwidth requirements for the logical connections based on parameters of the service;

mapping the connection topology to the physical topology, so that each of the logical connections is associated with one or more links of the physical topology; and allocating a bandwidth for the service on each of the links in response to the bandwidth requirements of the logical connections and to the mapping.

Typically, the network includes a ring network, the physical topology includes a ring topology, and the connection topology is chosen from one of a hub-and-spoke topology and a full mesh topology.

In an embodiment, the data transmission service includes a guaranteed bandwidth service, and may include a class of service defined by a protocol under which the network operates.

In an alternative embodiment, the method includes multiplying the bandwidth by a correction factor to determine an actual bandwidth.

In a disclosed embodiment, mapping the connection topology to the physical topology includes generating a bandwidth requirement for each of the links.

Typically, parameters of the service include respective node-bandwidths required by each of the nodes to provide the service.

The method may include monitoring traffic generated in the network by the data transmission service, and adjusting the bandwidth in response to the traffic.

In one embodiment, the data transmission service includes a plurality of subclasses of traffic, and allocating the bandwidth includes allocating a reserved bandwidth to one of the subclasses, and/or comparing a mapping bandwidth determined in response to the bandwidth requirements of the logical connections and to the mapping with a full bandwidth determined by assuming all possible logical connections in the network are provided for.

There is further provided, according to an embodiment of the present invention, a method for assigning bandwidth in a network including nodes coupled by links arranged in a physical topology, the method including:

defining between the nodes a first set of logical connections associated with a first data transmission service to be provided over the network, and a second set of logical connections associated with a second data transmission service to be provided over the network, the first set of logical connections having a first connection topology, the second set of logical connections having a second connection topology, the first and second connection topologies being different from the physical topology;

determining respective first bandwidth requirements for the first set of logical connections based on first parameters of the first data transmission service and respective second bandwidth requirements for the second set of logical connections based on second parameters of the second data transmission service;

generating a first mapping of the first connection topology to the physical topology, so that each of the first set of logical connections is associated with one or more links of the physical topology;

allocating a first bandwidth for the first data transmission service on each of the links in response to the first bandwidth requirements of the first set of logical connections and to the first mapping;

generating a second mapping of the second connection topology to the physical topology, so that each of the second set of logical connections is associated with one or more links of the physical topology;

allocating a second bandwidth for the second data transmission service on each of the links in response to the second bandwidth requirements of the second set of logical connections and to the second mapping; and summing the first and the second bandwidths to determine a total allocation for each of the links.

Typically, the network includes a ring network, and the physical topology includes a ring topology.

In an embodiment, the first connection topology includes a hub-and-spoke topology and the second connection topology includes a full mesh topology.

In a disclosed embodiment, at least one of the first and second data transmission services includes a guaranteed bandwidth service and/or a class of service defined by a protocol under which the network operates.

The method typically includes multiplying at least one of the first and second bandwidths by a correction factor to determine a corrected bandwidth.

In one embodiment, generating the first mapping includes generating a first bandwidth requirement for each of the links, and generating the second mapping includes generating a second bandwidth requirement for each of the links.

Typically, the first parameters of the first service include respective first node-bandwidths required by each of the nodes to provide the first service, and the second parameters of the second service include respective second node-bandwidths required by each of the nodes to provide the second service.

The method typically includes monitoring traffic generated in the network by the first and second data transmission services, and adjusting the total allocation in response to the traffic.

In an alternative embodiment, the first data transmission service includes a plurality of subclasses of traffic, and allocating the first bandwidth includes allocating a reserved bandwidth to one of the subclasses.

Typically, the first connection topology is different from the second connection topology.

In a further alternative embodiment, summing the first and the second bandwidths to determine a total allocation for each of the links includes:

determining a first mapping bandwidth in response to the first bandwidth requirements of the first set of logical connections and to the first mapping;

determining a second mapping bandwidth in response to the second bandwidth requirements of the second set of logical connections and to the second mapping; and comparing the first mapping bandwidth and the second mapping bandwidth with a full bandwidth determined by assuming all possible logical connections in the network are provided for.

There is further provided, according to an embodiment of the present invention, a method for assigning bandwidth in a ring network including nodes coupled by links, the method including:

defining between the nodes a first set of logical connections associated with a first data transmission service to be provided over the network, and a second set of logical connections associated with a second data transmission service to be provided over the network, the first set of logical connections having a hub-and-spokes connection topology, the second set of logical connections having a full mesh connection topology;

determining respective first bandwidth requirements for the first set of logical connections based on first parameters of the first data transmission service and respective second bandwidth requirements for the second set of logical connections based on second parameters of the second data transmission service;

generating a first mapping of the first connection topology to the ring network, so that each of the first set of logical connections is associated with one or more links of the ring network;

determining a first bandwidth for the first data transmission service on each of the links in response to the first bandwidth requirements of the first set of logical connections and to the first mapping;

generating a second mapping of the second connection topology to the ring topology, so that each of the second set of logical connections is associated with one or more links of the ring network;

determining a second bandwidth for the second data transmission service on each of the links in response to the second bandwidth requirements of the second set of logical connections and to the second mapping;

summing the first and the second bandwidths to determine a total bandwidth for each of the links; and allocating one of the first bandwidth, the second bandwidth, and the total bandwidth to each of the links in response to respectively providing the first service, the second service, and both services, over the network.

There is further provided, according to an embodiment of the present invention, apparatus for assigning bandwidth in a network including nodes coupled by links arranged in a physical topology, the apparatus including:

a controller which is adapted to:

receive a definition of logical connections between the nodes, the logical connections being associated with a data transmission service to be provided over the network, the logical connections having a connection topology different from the physical topology, determine respective bandwidth requirements for the logical connections based on parameters of the service, map the connection topology to the physical topology, so that each of the logical connections is associated with one or more links of the physical topology, and allocate a bandwidth for the service on each of the links in response to the bandwidth requirements of the logical connections and to the mapping.

Typically, the controller is included in one of the nodes or is external to the network.

There is further provided, according to an embodiment of the present invention, apparatus for assigning bandwidth in a network including nodes coupled by links arranged in a physical topology, the apparatus including:

a controller which is adapted to:

receive a definition of a first set of logical connections, between the nodes, associated with a first data transmission service to be provided over the network, and a second set of logical connections, between the nodes, associated with a second data transmission service to be provided over the network, the first set of logical connections having a first connection topology, the second set of logical connections having a second connection topology, the first and second connection topologies being different from the physical topology, determine respective first bandwidth requirements for the first set of logical connections based on first parameters of the first data transmission service and respective second bandwidth requirements for the second set of logical connections based on second parameters of the second data transmission service, generate a first mapping of the first connection topology to the physical topology, so that each of the first set of logical connections is associated with one or more links of the physical topology, allocate a first bandwidth for the first data transmission service on each of the links in response to the first bandwidth requirements of the first set of logical connections and to the first mapping, generate a second mapping of the second connection topology to the physical topology, so that each of the second set of logical connections is associated with one or more links of the physical topology, allocate a second bandwidth for the second data transmission service on each of the links in response to the second bandwidth requirements of the second set of logical connections and to the second mapping, and sum the first and the second bandwidths to determine a total allocation for each of the links.

Typically, the controller is in one of the nodes or is external to the network.

The present invention will be more fully understood from the following detailed description of the preferred embodiments thereof, taken together with the drawings, a brief description of which follows.

DETAILED DESCRIPTION OF EMBODIMENTS

Figure 1:
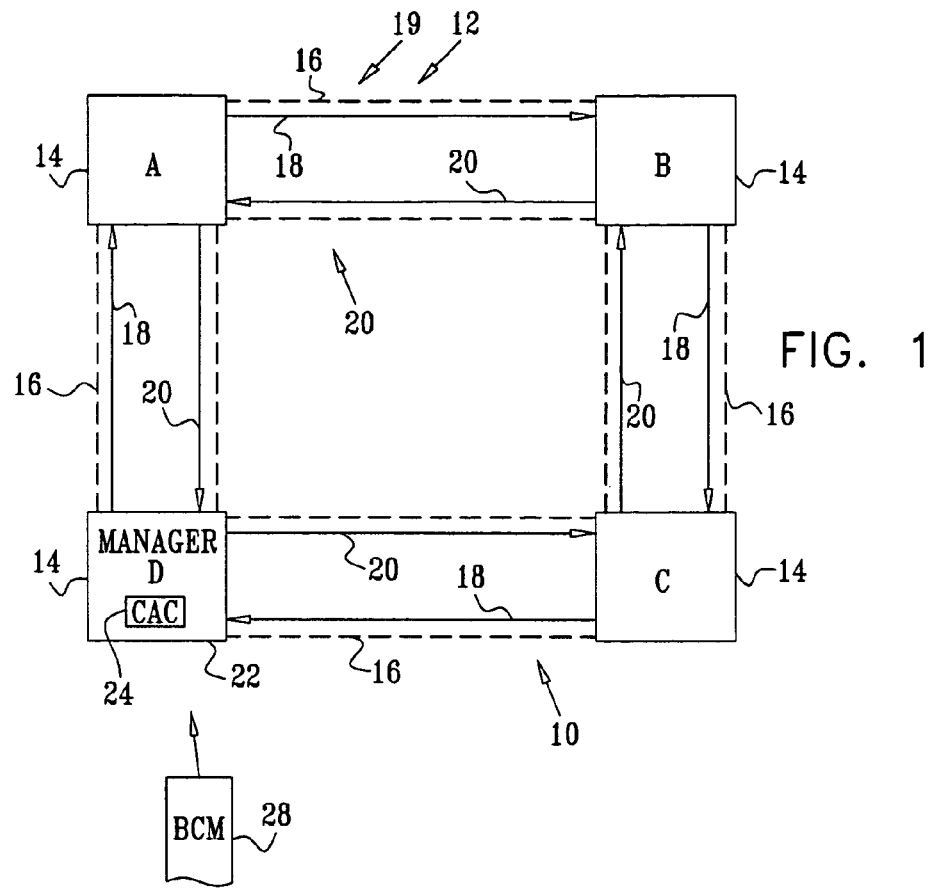
FIG. 1 is a schematic representation of a data communication system, according to an embodiment of the present invention.

Reference is now made to FIG. 1, which is a schematic representation of a data communication system 10, according to an embodiment of the present invention. System 10 is built around a high-speed ring network 12, such as a SONET or SDH network, having data nodes 14, also herein termed nodes A, B, C, D. Each pair of nodes is connected by a physical network link 16, which typically comprises a pair of wired, fiberoptic, and/or wireless links 18, 20, that are configured to carry data traffic in clockwise and counterclockwise directions around the ring. Thus network 12 comprises a clockwise network 19 and a counterclockwise network 21. One of the data nodes also serves as a manager node 22, comprising a connection admission controller (CAC) 24 which performs functions that are described hereinbelow. Alternatively, CAC 24 is implemented external to the network.

The topology of network 12, as of networks 19 and 21, is shown here by way of example, to illustrate aspects of the present invention. It will be understood, however, that the present invention is in no way limited in its applicability to this topology, and may equally be applied to other network topologies, as well. It will also be understood that in the context of the present patent application and in the claims, the terms "clockwise" and "counterclockwise" are used arbitrarily to distinguish between two opposing directions of packet flow in a ring network. These terms are chosen solely for convenience of explanation, and do not necessarily bear any relation to the physical characteristics of the network.

Network 12 serves as the infrastructure for a virtual packet communication network, such as a virtual private LAN. For example, nodes 14 may be connected to external Ethernet networks (not shown in the figure), and may package the Ethernet packets in virtual-concatenated containers provided by network 12. Alternatively or additionally, system 10 may be configured to support traffic of other types, in accordance with other protocols that are known in the art. Hereinbelow, by way of example, network 12 is assumed to be configured as a bi-directional Resilient Packet Ring (RPR) network, as defined by IEEE standard 802.17, wherein nodes are also referred to as stations and networks 19 and 21 are referred to as ringlets 0 and 1.

On setup of network 12, an operator of the network inputs a basic connectivity map (BCM) 28 to manager node 22. As explained below, BCM 28, also herein termed the applied BCM, is used to determine actual bandwidths that are to be applied to each of the links in network 12. The applied BCM is one of a number of different connectivity maps, each having a different logical topology and bandwidth relations, that the operator may input to node 22. Alternatively or additionally, more than one of the basic connectivity maps are stored in node 22, and the operator chooses one of the stored maps as the applied BCM. Each basic connectivity map comprises and defines a logical topology that connects nodes 14 of the network, required bandwidths for each of the nodes when operating in the logical topology, and a correction parameter, herein termed a deviation parameter (DP), that is used to formulate the actual bandwidths used by each link.

Except as stated below, the following description assumes that the bandwidths referred to are for traffic of a data transmission service requiring guaranteed bandwidths.

Figure 2:
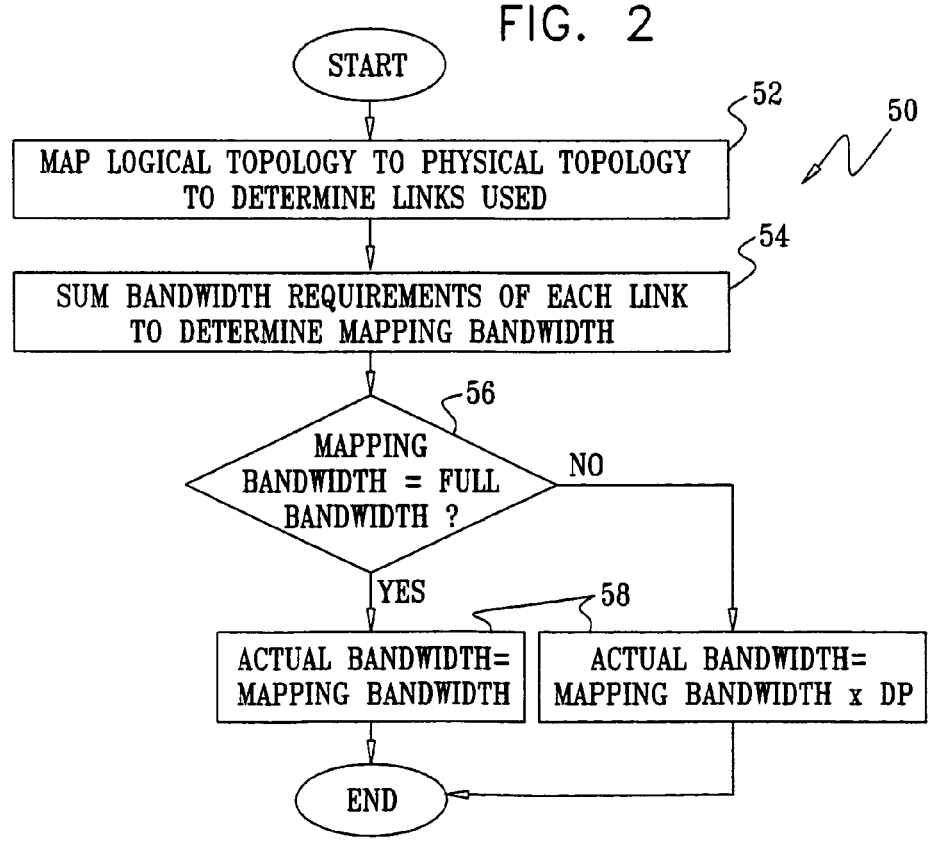
FIG. 2 is a flow chart showing steps of a process applied by a Connection Admission Controller (CAC) in allocating bandwidths to links in the system of FIG. 1, according to an embodiment of the present invention.

FIG. 2 is a flow chart showing steps of a process 50 applied by CAC 24 in allocating bandwidths to links 16 in network 12, according to an embodiment of the present invention. Examples of the application of process 50 are described in more detail below, with reference to FIGS. 3 and 4.

In a first step 52, CAC 24 maps the logical topology of the applied BCM to the existing physical topology of network 12. Performing the mapping generates actual links 16 and 18 used in network 12.

In a step 54, for each of the links the bandwidth requirements are summed to determine a mapping bandwidth, described in more detail below.

In a comparison step 56, the mapping bandwidths are compared with "full" bandwidths. In the specification and in the claims, full bandwidths are assumed to be bandwidths for each link if every possible connection in the network is provided for. It will be appreciated that applying full bandwidth allocations to every link ensures that there are always enough resources for transmitting packets between the nodes. However, full bandwidth allocations waste considerable bandwidth compared to the actual bandwidths needed.

In allocation steps 58, CAC 24 allocates actual bandwidths to each of the links based on the comparison. If the mapping bandwidth is equal to the full bandwidth, then CAC 24 uses the mapping bandwidth as an actual bandwidth applied to the link. If the mapping bandwidth is less than the full bandwidth, CAC 24 multiplies the mapping bandwidth by the deviation parameter to determine the actual bandwidth.

Figure 3:
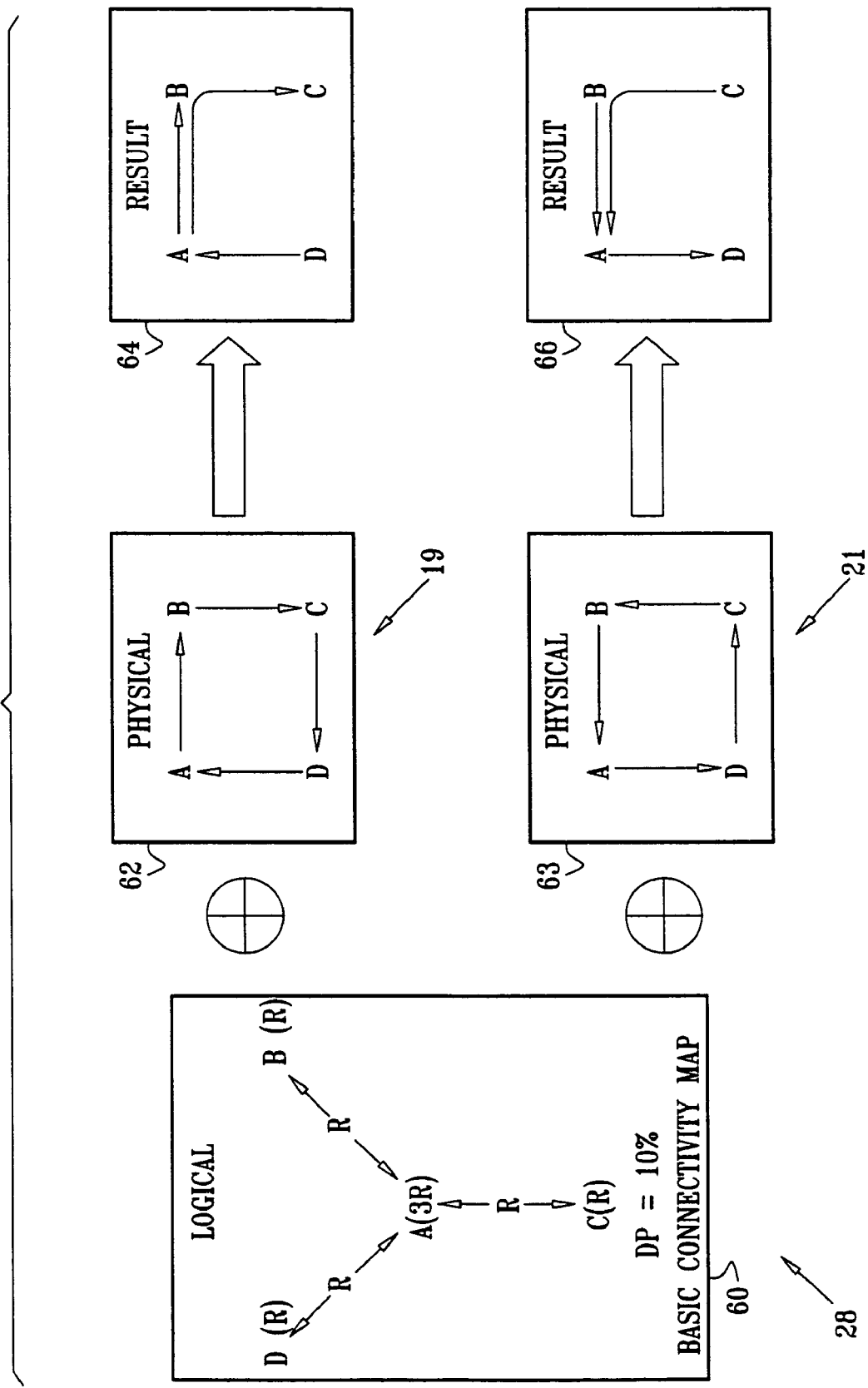
FIG. 3 is a schematic illustration of a first example of the process of FIG. 2, according to an embodiment of the present invention.

FIG. 3 is a schematic illustration of a first example of process 50 for determining the actual bandwidth of each link, according to an embodiment of the present invention. In this example, the nodes of network 12 are assumed to be logically connected in a hub and spoke arrangement, with A as the hub and B, C, and D at the ends of the spokes. Furthermore, node A is assumed to require a bandwidth of 3R, and each of nodes B, C, and D are assumed to require a bandwidth of R to communicate with hub node A, where R is a bandwidth factor measured in Mbps. Although it will be appreciated that for any specific node bandwidth requirements may be different in different directions (referred to herein as uplink and downlink directions), for simplicity the examples herein assume that the uplink and downlink requirements of a node are equal. The logical connectivity between the nodes, and the required bandwidths of the nodes and of the logical connections between them, are shown schematically in a diagram 60 of BCM 28. Diagram 60 also includes the DP, which for this example is set to be 10%.

In the following description of the steps of process 50, it is assumed by way of example that nodes A, B, C, and D are connected in a first physical topology formed by clockwise links 18, corresponding to network 19, and in a second physical topology of counterclockwise links 20, corresponding to network 21.

In step 52 of process 50, CAC 24 analyzes the basic connectivity map of diagram 60 to find links 18 of network 19 and links 20 of network 21 corresponding to the logical connections of the map. Diagram 60 shows that there are six direct logical connections A-B, A-C, A-D, B-A, C-A, and D-A required. Network 19, reproduced schematically here as a diagram 62, shows that the available single links in network 19 are A-B, B-C, C-D, and D-A. Network 21, reproduced schematically here as a diagram 63, shows that the available single links in network 21 are A-D, D-C, C-B, and B-A. CAC 24 typically selects from the available single links a minimum hop path between any two nodes, and typically also balances the allocation of the links between the two networks.

Table I below shows the relation between the connections of the hub and spoke map assumed, and the links 18 and 20 selected by CAC 24 in step 52.

TABLE I

| Hub and Spoke Connections | Network 19 Links | Network 21 Links |
|---|---|---|
| A-B | A-B | |
| A-C | A-B and B-C | |
| A-D | | A-D |
| B-A | | B-A |
| C-A | | C-B and B-A |
| D-A | D-A | |

Diagrams 64 and 66 illustrate the results shown by Table I.

In step 54, CAC 24 uses the results of Table I to determine theoretical bandwidths, also herein termed mapping bandwidths, for each link of the networks, as described herein with respect to Table II below. Table II is derived from Table I, and shows the bandwidth requirements for each link according to the required connections. In determining entries in Table II, it is assumed that only nodes at the ends of paths are effective in determining the bandwidth. Thus, connection A-B requires R bandwidth from nodes A and B, and R bandwidth in link A-B. Connection A-C requires R bandwidth from nodes A and C, and R bandwidth in links A-B and B-C. As stated above, node A provides a bandwidth of 3R, greater than the 2R required by Table II; and each of nodes B and C provide a bandwidth of R as required by Table II. The bandwidth for each link is derived by summing the individual connection requirements of the link and corresponds to the mapping bandwidth used by CAC 24.

TABLE II

| Link | Connection | | | | | | Mapping Bandwidth Total |
|---|---|---|---|---|---|---|---|
| | A-B | A-C | A-D | B-A | C-A | D-A | |
| A-B | R | R | | | | | 2R |
| B-C | | R | | | | | R |
| C-D | | | | | | | 0 |
| D-A | | | | | R | | R |
| A-D | | | R | | | | R |
| D-C | | | | | | | 0 |
| C-B | | | | | R | | R |
| B-A | | | | R | R | | 2R |

For comparison, Table III below shows the full bandwidth requirements. (As stated above, full bandwidths are assumed to be bandwidths for each link if every possible connection in the network is provided for.) Table III is constructed using the same node bandwidth constraints as for Table II, i.e., 3R for node A and R for nodes B, C, and D. The totals for each link are derived by summing the individual connection requirements, except that the requirements indicated by R* are not summed since the available R has already been allocated in a link. For example, connection B-C uses R from node B; thus connection B-D may not use R from node B since node B only provides R.

TABLE III

| Link | Connection | | | | | | | | | | | | Full Total |
|---|---|---|---|---|---|---|---|---|---|---|---|---|---|
| | A-B | A-C | A-D | B-A | B-C | B-D | C-A | C-B | C-D | D-A | D-B | D-C | |
| A-B | R | R | | | | | | | | | | | 2R |
| B-C | | R | | | R | R* | | | | | | | 2R |
| C-D | | | | | | R | | | R | | | | 2R |
| D-A | | | | | | | | | | R | | | R |
| A-D | | R | | | | | | | | | | | R |
| D-C | | | | | | | | | | R* | R | | R |
| C-B | | | | | | | R* | R | | | R | | 2R |
| B-A | | | R | | | R | | | | | | | 2R |

In comparison step 56 and allocation step 58, CAC 24 compares the full bandwidths with the mapping bandwidths and allocates actual bandwidths. The results of the comparison and allocation are shown in Table IV below.

TABLE IV

| | Link (Network 19) | | | | Link (Network 21) | | | |
|---|---|---|---|---|---|---|---|---|
| | A-B | B-C | C-D | D-A | A-D | D-C | C-B | B-A |
| Full | 2R | 2R | 2R | R | R | R | 2R | 2R |
| Mapping | 2R | R | 0 | R | R | 0 | R | 2R |
| Actual | 2R | 1.1R | 0 | R | R | 0 | 1.1R | 2R |

As shown in Table IV, links A-B, D-A, A-D and B-A are allocated bandwidths corresponding to the full bandwidth, since the full and mapping bandwidths are equal. The other links are allocated bandwidths corresponding to the mapping bandwidth multiplied by the deviation parameter (DP) of 10%, since the mapping bandwidth is less than the full bandwidth.

Inspection of Table IV shows that actual allocated bandwidths for links, derived by applying process 50, may be significantly less than the full bandwidths, leading to more efficient bandwidth utilization within network 12.

Figure 4:
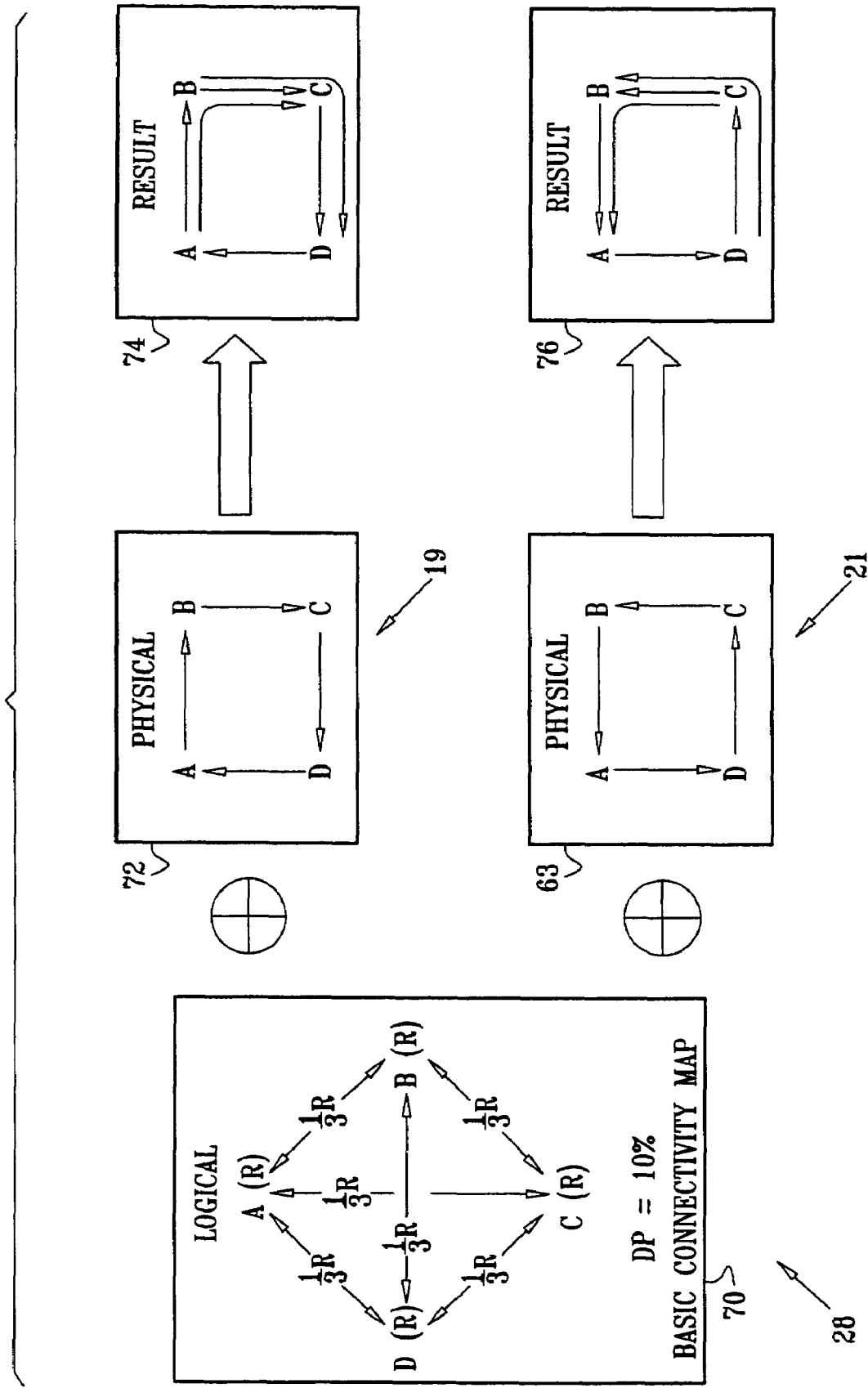
FIG. 4 is a schematic illustration of a second example of the process of FIG. 2, according to an embodiment of the present invention.

FIG. 4 is a schematic illustration of a second example of process 50 for determining the actual bandwidth of each link, according to an embodiment of the present invention. In this example, nodes A, B, C, and D are assumed to be logically connected in a balanced full mesh arrangement, and each of the nodes is assumed to be require a bandwidth of R. The logical connectivity between the nodes, and the required bandwidths of the nodes and their logical connections, are shown schematically in a diagram 70 of BCM 28. Diagram 70 also includes the DP, which for this example is also set to be 10%.

In step 52, the basic connectivity map of diagram 70 is analyzed to find links 18 of network 19 and links 20 of network 21 corresponding to the logical connections of the map. Diagram 70 shows that there are twelve direct connections required. Table V below shows the relation between the connections of the balanced full mesh map assumed, and the links of networks 19 and 21, illustrated by diagrams 72, 73, 74, and 76, that provide the connections.

TABLE V

| Full Mesh Connections | Network 19 Links | Network 21 Links |
|---|---|---|
| A-B | A-B | |
| A-C | A-B and B-C | |
| A-D | | A-D |
| B-A | | B-A |
| B-C | B-C | |
| B-D | B-C and C-D | |
| C-A | | C-B and B-A |
| C-B | | C-B |
| C-D | C-D | |
| D-A | D-A | |
| D-B | | D-C and C-B |
| D-C | | D-C |

Table VI below shows the mapping bandwidths determined by CAC 24 in step 54 from Table V. (Table VI corresponds to Table II.)

TABLE VI

| Link | Connection | | | | | | | | | | | | Mapping Total |
|---|---|---|---|---|---|---|---|---|---|---|---|---|---|
| | A-B | A-C | A-D | B-A | B-C | B-D | C-A | C-B | C-D | D-A | D-B | D-C | |
| A-B | $\frac{1}{3}R$ | $\frac{1}{3}R$ | | | | | | | | | | | $\frac{2}{3}R$ |
| B-C | | $\frac{1}{3}R$ | | | $\frac{1}{3}R$ | $\frac{1}{3}R$ | | | | | | | R |
| C-D | | | | | | $\frac{1}{3}R$ | | | $\frac{1}{3}R$ | | | | $\frac{2}{3}R$ |
| D-A | | | | | | | | | | $\frac{1}{3}R$ | | | $\frac{1}{3}R$ |
| A-D | | | $\frac{1}{3}R$ | | | | | | | | | | $\frac{1}{3}R$ |
| D-C | | | | | | | | | | | $\frac{1}{3}R$ | $\frac{1}{3}R$ | $\frac{2}{3}R$ |
| C-B | | | | | | | $\frac{1}{3}R$ | $\frac{1}{3}R$ | | | $\frac{1}{3}R$ | | R |
| B-A | | | | $\frac{1}{3}R$ | | | $\frac{1}{3}R$ | | | | | | $\frac{2}{3}R$ |

Table VII below shows the results of applying comparison step 56 and allocation step 58 to the results of Table VI. The full bandwidths are derived in a substantially similar manner to that used to derive the values in Table III above.

TABLE VII

| | Link (Network 19) | | | | Link (Network 21) | | | |
|---|---|---|---|---|---|---|---|---|
| | A-B | B-C | C-D | D-A | A-D | D-C | C-B | B-A |
| Full Mapping | R $\frac{2}{3}R$ | 2R R | 2R $\frac{2}{3}R$ | R $\frac{1}{3}R$ | R $\frac{1}{3}R$ | R $\frac{2}{3}R$ | 2R R | 2R $\frac{2}{3}R$ |
| Actual | $\frac{2.2}{3}R$ | 1.1R | $\frac{2.2}{3}R$ | $\frac{1.1}{3}R$ | $\frac{1.1}{3}R$ | $\frac{2.2}{3}R$ | 1.1R | $\frac{2.2}{3}R$ |

As for the hub and spoke system described above with reference to FIG. 3, Table VII shows that by applying process 50 actual allocated bandwidths for links for a full mesh system are significantly less than the full bandwidths.

For clarity, the examples described above with respect to FIGS. 3 and 4 have each used only one BCM defining logical connectivity for guaranteed bandwidth. It will be appreciated, however, that more than one BCM may be applied in network 12 for different data transmission services. For example, in network 12 a first BCM may assume that nodes A, B, and C are logically connected according to a hub and spoke arrangement, where A is the hub node and B and C are nodes at the ends of spokes, and a second BCM may assume that nodes B, C, and D are connected in a balanced full mesh arrangement. Both BCMs are mapped to the network, substantially as described above with respect to FIGS. 2, 3, and 4, to generate total allocated bandwidths for each link of the network, corresponding to line 5 of Tables IV and VII.

For any specific BCM, the operator may make adjustments to the allocated bandwidths determined by mapping the BCM to network 12. For example, for the hub and spoke system described above with reference to FIG. 3, the operator may increase the bandwidth set for link C-D, such an increase typically being warranted if the operator is aware that there is significant traffic between nodes C and D. Furthermore, the deviation parameter for each of the links in the network may be set to be different values. Alternatively or additionally, the BCM may include other parameters applicable to traffic flow in the logical network (represented by the BCM) or of the physical network. For example, in a BCM for guaranteed traffic, the operator may add in that a specific subclass of guaranteed traffic, such as guaranteed broadcast traffic, has a specified bandwidth reserved in the physical network.

Figure 5:
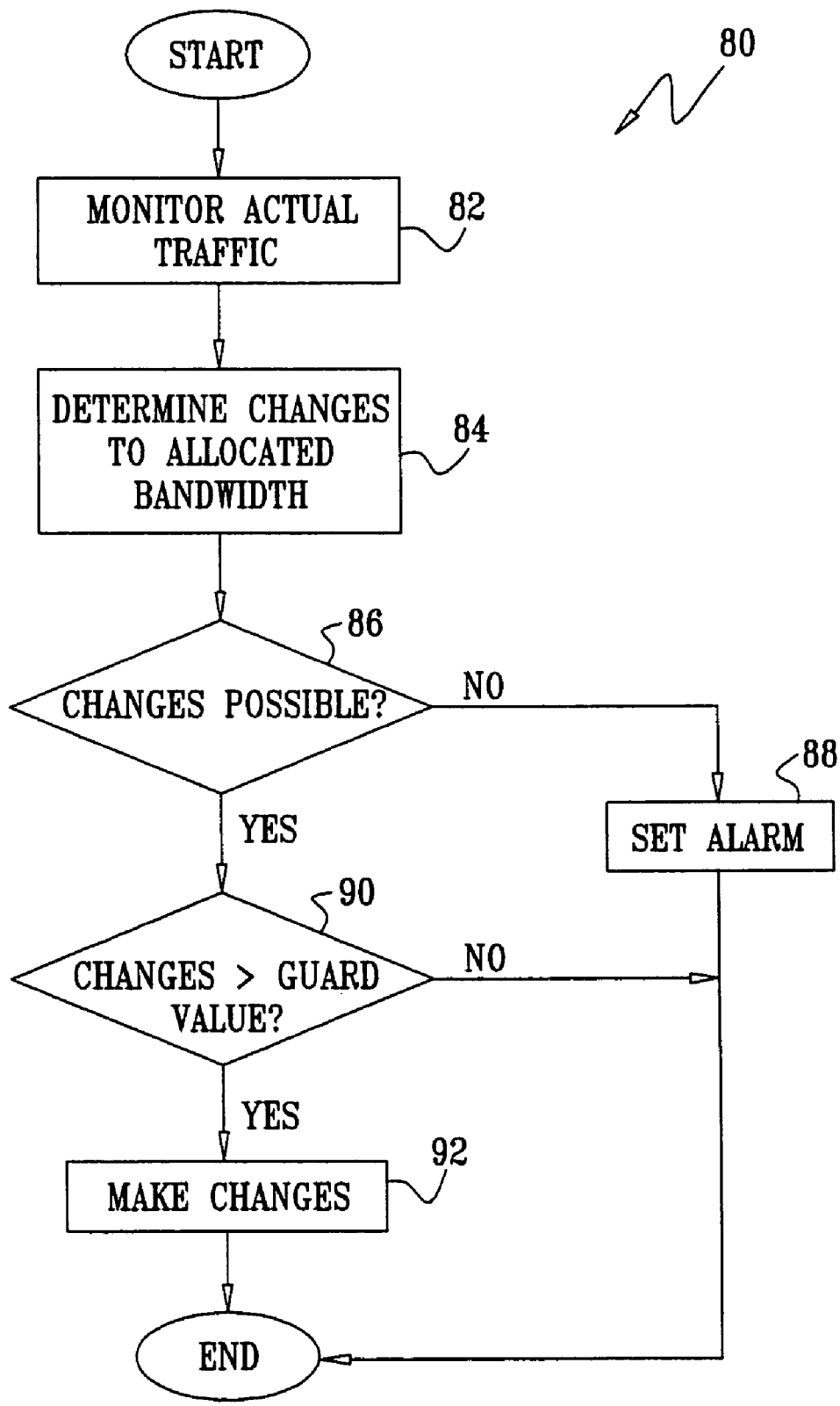
FIG. 5 is a flow chart showing an automatic management process performed by a manager node during operation of the system of FIG. 1, according to an embodiment of the present invention.

FIG. 5 is a flow chart showing an automatic management process 80 performed by manager node 22 during operation of network 12, according to an embodiment of the present invention. Process 80 is performed after process 50. In a first step 82, manager node 22 monitors and measures actual traffic between the nodes in network 12. The measurements are made for each of the services that have had allocated bandwidths.

In a second step 84, node 22 determines intended changes to the allocated bandwidth values, corresponding to lines 5 of Tables IV and VII, according to differences from the actual measured traffic determined in the step 82. Typically, the determination is performed periodically, at times set by an operator of the network. The intended bandwidth change for each link may be averaged, for example by a moving time average or another suitable averaging process known in the art, so that in implementing the change manager 22 typically does not make abrupt changes in bandwidth allocation.

In a decision step 86, manager node 22 checks if the intended changes to the allocated bandwidths for the links are possible, e.g., if intermediate spans of a link where bandwidth is to be increased are able to supply the increase.

If the intended changes are not possible, in an alarm step 88 manager node 22 sets an alarm to notify the network operator. If the intended changes are possible, then in a second decision step 90, manager node 22 checks if the intended changes are greater then a guard value. The guard value is typically preset by the operator of the system so as to preclude unnecessarily high rates of change of bandwidth values. If the required changes are greater than the guard value, then in an implementation step 92, manager 22 makes the changes. If the changes are less than or equal to the guard value, there is no change in allocated bandwidth.

It will be appreciated that the management tasks exemplified by process 80, as well as other management tasks for network 12, may be at least partly performed non-automatically. For example, the network operator may periodically check that the one or more BCMs mapped to the network are still valid, and that their parameters are still applicable. If there have been changes, the operator may change one or more of the allocated link bandwidths and/or apply a different BCM. Alternatively or additionally, manager node 22 may make measurements of bandwidth usage, substantially as described for step 82 above, and provide an indication to the network operator if there are any relatively long term deviations from the allocated bandwidths.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for assigning bandwidth in a network including nodes coupled by links arranged in a physical topology, the method comprising:
   defining between the nodes logical connections associated with a data transmission service to be provided over the network, the logical connections having a connection topology different from the physical topology;
   determining respective bandwidth requirements for the logical connections based on parameters of the service;
   mapping the connection topology to the physical topology, so that each of the logical connections is associated with one or more links of the physical topology; and
   allocating a bandwidth for the service on each of the links in response to the bandwidth requirements of the logical connections and to the mapping.

2. The method according to claim 1, wherein the network comprises a ring network, and wherein the physical topology comprises a ring topology.

3. The method according to claim 1, wherein the connection topology is chosen from one of a hub-and-spoke topology and a full mesh topology.

4. The method according to claim 1, wherein the data transmission service comprises a guaranteed bandwidth service.

5. The method according to claim 1, wherein the data transmission service comprises a class of service defined by a protocol under which the network operates.

6. The method according to claim 1, and comprising multiplying the bandwidth by a correction factor to determine an actual bandwidth.

7. The method according to claim 1, wherein mapping the connection topology to the physical topology comprises generating a bandwidth requirement for each of the links.

8. The method according to claim 1, wherein parameters of the service comprise respective node-bandwidths required by each of the nodes to provide the service.

9. The method according to claim 1, and comprising monitoring traffic generated in the network by the data transmission service, and adjusting the bandwidth in response to the traffic.

10. The method according to claim 1, wherein the data transmission service comprises a plurality of subclasses of traffic, and wherein allocating the bandwidth comprises allocating a reserved bandwidth to one of the subclasses.

11. The method according to claim 1, wherein allocating the bandwidth comprises comparing a mapping bandwidth determined in response to the bandwidth requirements of the logical connections and to the mapping with a full bandwidth determined by assuming all possible logical connections in the network are provided for.

12. A method for assigning bandwidth in a network including nodes coupled by links arranged in a physical topology, the method comprising:
   defining between the nodes a first set of logical connections associated with a first data transmission service to be provided over the network, and a second set of logical connections associated with a second data transmission service to be provided over the network, the first set of logical connections having a first connection topology, the second set of logical connections having a second connection topology, the first and second connection topologies being different from the physical topology;
   determining respective first bandwidth requirements for the first set of logical connections based on first parameters of the first data transmission service and respective second bandwidth requirements for the second set of logical connections based on second parameters of the second data transmission service;
   generating a first mapping of the first connection topology to the physical topology, so that each of the first set of logical connections is associated with one or more links of the physical topology;
   allocating a first bandwidth for the first data transmission service on each of the links in response to the first bandwidth requirements of the first set of logical connections and to the first mapping;
   generating a second mapping of the second connection topology to the physical topology, so that each of the second set of logical connections is associated with one or more links of the physical topology;
   allocating a second bandwidth for the second data transmission service on each of the links in response to the second bandwidth requirements of the second set of logical connections and to the second mapping; and
   summing the first and the second bandwidths to determine a total allocation for each of the links.

13. The method according to claim 12, wherein the network comprises a ring network, and wherein the physical topology comprises a ring topology.

14. The method according to claim 12, wherein the first connection topology comprises a hub-and-spoke topology and the second connection topology comprises a full mesh topology.

15. The method according to claim 12, wherein at least one of the first and second data transmission services comprises a guaranteed bandwidth service.

16. The method according to claim 12, wherein at least one of the first and second data transmission services comprises a class of service defined by a protocol under which the network operates.

17. The method according to claim 12, and comprising multiplying at least one of the first and second bandwidths by a correction factor to determine a corrected bandwidth.

18. The method according to claim 12, wherein generating the first mapping comprises generating a first bandwidth requirement for each of the links, and wherein generating the second mapping comprises generating a second bandwidth requirement for each of the links.

19. The method according to claim 12, wherein the first parameters of the first service comprise respective first node-bandwidths required by each of the nodes to provide the first service, and wherein the second parameters of the second service comprise respective second node-bandwidths required by each of the nodes to provide the second service.

20. The method according to claim 12, and comprising monitoring traffic generated in the network by the first and second data transmission services, and adjusting the total allocation in response to the traffic.

21. The method according to claim 12, wherein the first data transmission service comprises a plurality of subclasses of traffic, and wherein allocating the first bandwidth comprises allocating a reserved bandwidth to one of the subclasses.

22. The method according to claim 12, wherein the first connection topology is different from the second connection topology.

23. The method according to claim 12, wherein summing the first and the second bandwidths to determine a total allocation for each of the links comprises:
  determining a first mapping bandwidth in response to the first bandwidth requirements of the first set of logical connections and to the first mapping;
  determining a second mapping bandwidth in response to the second bandwidth requirements of the second set of logical connections and to the second mapping; and
  comparing the first mapping bandwidth and the second mapping bandwidth with a full bandwidth determined by assuming all possible logical connections in the network are provided for.

24. A method for assigning bandwidth in a ring network including nodes coupled by links, the method comprising:
  defining between the nodes a first set of logical connections associated with a first data transmission service to be provided over the network, and a second set of logical connections associated with a second data transmission service to be provided over the network, the first set of logical connections having a hub-and-spokes connection topology, the second set of logical connections having a full mesh connection topology;
  determining respective first bandwidth requirements for the first set of logical connections based on first parameters of the first data transmission service and respective second bandwidth requirements for the second set of logical connections based on second parameters of the second data transmission service;
  generating a first mapping of the first connection topology to the ring network, so that each of the first set of logical connections is associated with one or more links of the ring network;
  determining a first bandwidth for the first data transmission service on each of the links in response to the first bandwidth requirements of the first set of logical connections and to the first mapping;
  generating a second mapping of the second connection topology to the ring topology, so that each of the second set of logical connections is associated with one or more links of the ring network;
  determining a second bandwidth for the second data transmission service on each of the links in response to the second bandwidth requirements of the second set of logical connections and to the second mapping;
  summing the first and the second bandwidths to determine a total bandwidth for each of the links; and
  allocating one of the first bandwidth, the second bandwidth, and the total bandwidth to each of the links in response to respectively providing the first service, the second service, and both services, over the network.

25. Apparatus for assigning bandwidth in a network including nodes coupled by links arranged in a physical topology, the apparatus comprising:
  a controller which is adapted to:
  receive a definition of logical connections between the nodes, the logical connections being associated with a data transmission service to be provided over the network, the logical connections having a connection topology different from the physical topology,
  determine respective bandwidth requirements for the logical connections based on parameters of the service,
  map the connection topology to the physical topology, so that each of the logical connections is associated with one or more links of the physical topology, and
  allocate a bandwidth for the service on each of the links in response to the bandwidth requirements of the logical connections and to the mapping.

26. Apparatus according to claim 25, wherein the controller is comprised in one of the nodes.

27. Apparatus according to claim 25, wherein the controller is external to the network.

28. Apparatus for assigning bandwidth in a network including nodes coupled by links arranged in a physical topology, the apparatus comprising:
  a controller which is adapted to:
  receive a definition of a first set of logical connections, between the nodes, associated with a first data transmission service to be provided over the network, and a second set of logical connections, between the nodes, associated with a second data transmission service to be provided over the network, the first set of logical connections having a first connection topology, the second set of logical connections having a second connection topology, the first and second connection topologies being different from the physical topology,
  determine respective first bandwidth requirements for the first set of logical connections based on first parameters of the first data transmission service and respective second bandwidth requirements for the second set of logical connections based on second parameters of the second data transmission service,
  generate a first mapping of the first connection topology to the physical topology, so that each of the first set of logical connections is associated with one or more links of the physical topology,
  allocate a first bandwidth for the first data transmission service on each of the links in response to the first bandwidth requirements of the first set of logical connections and to the first mapping,
  generate a second mapping of the second connection topology to the physical topology, so that each of the second set of logical connections is associated with one or more links of the physical topology, allocate a second bandwidth for the second data transmission service on each of the links in response to the second bandwidth requirements of the second set of logical connections and to the second mapping, and sum the first and the second bandwidths to determine a total allocation for each of the links.

29. Apparatus according to claim 28, wherein the controller is comprised in one of the nodes.

30. Apparatus according to claim 28, wherein the controller is external to the network.

* * * * *